US008510002B2

(12) United States Patent
Sakai et al.

(10) Patent No.: US 8,510,002 B2
(45) Date of Patent: Aug. 13, 2013

(54) ENGINE SPEED CONTROL DEVICE AND MOTOR GRADER INCLUDING THE SAME

(75) Inventors: Yukihisa Sakai, Komatsu (JP); Haruki Shinagawa, Kashiwazaki (JP); Hirohito Hagiwara, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/500,830

(22) PCT Filed: Oct. 13, 2010

(86) PCT No.: PCT/JP2010/067948

§ 371 (c)(1),
(2), (4) Date: Apr. 6, 2012

(87) PCT Pub. No.: WO2011/046140

PCT Pub. Date: Apr. 21, 2011

(65) Prior Publication Data

US 2012/0199371 A1 Aug. 9, 2012

(30) Foreign Application Priority Data

Oct. 14, 2009 (JP) ................................ 2009-236868

(51) Int. Cl.
*G06F 7/00* (2006.01)
*G06F 17/00* (2006.01)
*G06F 19/00* (2011.01)

(52) U.S. Cl.
USPC ................................ 701/52; 701/51; 477/111

(58) Field of Classification Search
USPC ................. 477/111, 110, 54, 62, 64, 84, 125, 477/18, 107, 46, 169, 175; 701/51, 52, 50; 172/3, 4; 123/352
See application file for complete search history.

(56) References Cited

U.S. PATENT DOCUMENTS

| | | | | |
|---|---|---|---|---|
| 4,976,170 | A * | 12/1990 | Hayashi et al. | 477/43 |
| 6,648,795 | B2 * | 11/2003 | Kobayashi | 477/54 |
| 6,865,965 | B2 * | 3/2005 | Uchino | 74/335 |
| 6,929,583 | B2 * | 8/2005 | Ayabe et al. | 477/109 |
| 6,931,315 | B2 * | 8/2005 | Ayabe et al. | 701/59 |

(Continued)

FOREIGN PATENT DOCUMENTS

| | | | |
|---|---|---|---|
| JP | 5-223153 | A | 8/1993 |
| JP | 2003-343325 | A | 12/2003 |
| JP | 2008-157140 | A | 7/2008 |

OTHER PUBLICATIONS

International Search Report of corresponding PCT Application No. PCT/JP2010067948.

*Primary Examiner* — Árpád Fábián-Kovács
(74) *Attorney, Agent, or Firm* — Global IP Counselors, LLP

(57) ABSTRACT

An engine speed control device is adapted to control a motor grader including a transmission with a plurality of manually shiftable low speed stages and at least one high speed stage, the transmission being configured to switch between a manual mode for manually selecting one of all the speed stages and an automatic shifting mode for automatically shifting a predetermined speed stage and higher. The engine speed control device includes an upper limit engine speed control unit configured to set an upper limit engine speed to be an out-of-service travelling-use upper limit engine speed at the at least one high speed stage, and set the upper limit engine speed to be a working-use upper limit engine speed at any one of the low speed stages, the working-use upper limit engine speed being lower than the out-of-service travelling-use upper limit engine speed.

12 Claims, 10 Drawing Sheets

(56) References Cited

U.S. PATENT DOCUMENTS

| | | | | |
|---|---|---|---|---|
| 7,006,907 | B2 * | 2/2006 | Usuki et al. | 701/51 |
| 7,222,011 | B2 * | 5/2007 | Smith et al. | 701/51 |
| 7,472,684 | B1 * | 1/2009 | McKee et al. | 123/352 |
| 7,530,924 | B2 * | 5/2009 | Brevick | 477/176 |
| 7,543,693 | B2 * | 6/2009 | Nakayashiki et al. | 192/3.21 |
| 7,563,195 | B2 * | 7/2009 | Ota et al. | 477/107 |
| 8,055,414 | B2 * | 11/2011 | Tawara | 701/52 |
| 8,382,641 | B2 * | 2/2013 | Nishimaki et al. | 477/169 |
| 2003/0221845 | A1 | 12/2003 | Takahashi | |
| 2009/0011902 | A1 * | 1/2009 | Tomiyama | 477/169 |

* cited by examiner

| SPEED STAGES | | FULL | | PARTIAL | | IDLE | | LIMITED VALUES | |
|---|---|---|---|---|---|---|---|---|---|
| | | SHIFT UP | SHIFT DOWN | SHIFT UP | SHIFT DOWN | SHIFT UP | SHIFT DOWN | | |
| LOW SPEED STAGES | F1 | – | – | – | – | – | – | 1800 | WORKING-USE UPPER LIMIT ENGINE SPEED |
| | F2 | – | – | – | – | – | – | 1800 | |
| | F3 | – | – | – | – | – | – | 1800 | |
| MIDDLE SPEED STAGES | F4 | 1700 | – | 1600 | – | 1450 | – | 2000 | AUTOMATIC-SHIFTING-USE UPPER LIMIT ENGINE SPEED |
| | F5 | 1950 | 1050 | 1700 | 900 | 1550 | 900 | 2000 | |
| | F6 | 2000 | 1150 | 1750 | 1050 | 1600 | 1050 | 2000 | |
| HIGH SPEED STAGES | F7 | 2075 | 1300 | 1800 | 1150 | 1750 | 1150 | (2200) | OUT-OF-SERVICE TRAVELLING-USE UPPER LIMIT ENGINE SPEED |
| | F8 | – | 1335 | – | 1200 | – | 1150 | (2200) | |

FIG. 7

| | | F1 | F2 | F3 | F4 | F5 | F6 | F7 | F8 |
|---|---|---|---|---|---|---|---|---|---|
| MANUAL SPEED-STAGE SHIFTING MODE | MANUAL SPEED-STAGE SHIFTING | ◉ | ◉ | ◉ | ◉ | ◉ | ◉ | ◉ | ◉ |
| | AUTOMATIC SPEED-STAGE SHIFTING | – | – | – | – | – | – | – | – |
| AUTOMATIC SPEED-STAGE SHIFTING MODE | MANUAL SPEED-STAGE SHIFTING | ○ | ○ | ○ | ○ | – | – | – | – |
| | AUTOMATIC SPEED-STAGE SHIFTING | – | – | – | – | ◎ | ◎ | ◎ | ◎ |

◉ : LOCK-UP CLUTCH ENGAGED STATE

◎ : THE LOCK-UP CLUTCH IS BASICALLY DISENGAGED BUT IS AUTOMATICALLY ENGAGED WHEN THE VEHICLE SPEED IS INCREASED AND SLIPPAGE OF THE TORQUE CONVERTER IS REDUCED.

○ : LOCK-UP CLUTCH RELEASE STATE

FIG. 8

ENGINE SPEED CONTROL DEVICE AND MOTOR GRADER INCLUDING THE SAME

CROSS-REFERENCE TO RELATED APPLICATIONS

This application claims priority to Japanese Patent Application No. 2009-236868, filed on Oct. 14, 2009, the disclosure of which is hereby incorporated herein by reference in its entirety.

BACKGROUND OF THE INVENTION

Field of the Invention

The present invention relates to an engine speed control device, particularly to an engine speed control device for a motor grader equipped with a transmission having a plurality of manually shiftable low speed stages and at least a high speed stage. Further, the present invention relates to a motor grader embedded with such an engine speed control device as described above.

[The motor graders are work vehicles for executing a variety of works such as a leveling work and a snow removal work with respect to the road surface or the ground surface. The motor graders normally include an engine, front and rear travelling wheels, a working unit having a blade or the like, and a power transmission mechanism having a torque converter and a transmission. The transmission has a plurality of speed stages configured to be switched hack and froth by means of either manual shifting or combination of manual shifting and automatic shifting.

Saving of fuel consumption has been recently demanded for the motor graders as described above, similarly to the other work vehicles. In view of this, an engine output control device has been proposed as described in Domestic Republication of PCT International Application Publication No. W02005/042951. The engine output control device of Domestic Republication of PCT International Application Publication No. W02005/042951 stores a plurality of engine output curves. A suitable one is configured to be selected from the output curves in accordance with a working mode and the engine output is controlled based on the selected output curve. In other words, the engine output is limited in accordance with a condition. Accordingly, fuel consumption is improved and work performance is enhanced.

Further, Japan Laid-open Patent Application Publication No. JP-A-S63-70311 describes a configuration for improving fuel consumption by shifting a regulation line of the maximum engine speed towards a lower engine speed range when a transmission is set to be in the maximum speed stage.

SUMMARY

Now, the motor graders are required to stably travel at a quite low speed of around 1 km/h in executing either a leveling work or a snow removal work. In out-of-service travelling without working, by contrast, the motor graders are required to travel at a high speed of greater than or equal to 50 km/h. In view of this, the motor graders have a plurality of speed stages set for use in a quite wide speed range.

Further, the motor graders often execute works at a speed of roughly 10 km/h while the transmission is set to be in the second speed of the low speed stages (i.e., the first to third speeds), for instance, and the accelerator pedal is fully pressed down.

In many cases, such works executed by the motor graders are of a type with relatively light load. Therefore, engine torque will be excessive with respect to load when such a work is executed at a low speed stage and the accelerator pedal is fully pressed down. In other words, fuel is unnecessarily consumed in executing such a work and fuel consumption gets worse. The well-known arts as described in the aforementioned Domestic Republication of PCT International Application Publication No. W02005/042951 and Japan Laid-open Patent Application Publication No. JP-A-S63-70311 cannot efficiently improve fuel consumption in the aforementioned condition. Further, travel speed is reduced in out-of-service travelling when the maximum engine speed is limited in the maximum speed stage as described in Japan Laid-open Patent Application Publication No. JP-A-S63-70311.

It is an object of the present invention to efficiently improve fuel consumption of a motor grader in working, and simultaneously, prevent reduction in the maximum speed of the motor grader in out-of-service travelling.

An engine speed control device for a motor grader according to a first aspect of the present invention is a device for controlling the engine speed of the motor grader. The motor grader includes a transmission with a plurality of manually shiftable low speed stages and at least a high speed stage. The transmission is configured to switch between a manual mode for manually selecting one of all the speed stages and an automatic shifting mode for automatically shifting a predetermined speed stage and higher. The engine speed control device includes and an upper limit engine speed control unit. The upper limit engine speed control unit is configured to: set an upper limit engine speed to be an out-of-service travelling-use upper limit engine speed at any one of said at least a high speed stage; and set the upper limit engine speed to be a working-use upper limit engine speed at any one of the low speed stages. The working-use upper limit engine speed is herein lower than the out-of-service travelling-use upper limit engine speed.

According to the engine speed control device of the first aspect of the present invention, the upper limit engine speed is set to be the relatively low working-use upper limit engine speed at any one of the manually shiftable low speed stages. Therefore, the maximum speed at each low speed stage is lowered than that of the well-known vehicles that the upper limit engine speed is not limited. As a result, an operator will shift up the current speed stage to a higher speed stage at an early timing. In other words, an operator is encouraged to shift up the current speed stage at the timing earlier than that in the well-known vehicles by the limitation of the upper limit engine speed to the working-use upper limit engine speed. Accordingly, a speed stage higher than that in the well-known vehicles is selected in working. Fuel consumption can be thereby improved in working.

On the other hand, the upper limit engine speed is set to be the higher out-of-service travelling-use upper limit engine speed at the higher speed stage/stages. Therefore, the maximum speed can be reliably obtained at the high speed stages used for out-of-service travelling, similarly to the well-known vehicles. Extension of a period of time for out-of-service travelling is prevented.

It should be noted in the present invention that the upper limit engine speed is only limited without limiting the engine torque. Therefore, the engine torque is not reduced. Further, the upper limit engine speed is herein thus limited, but reduction in power in working can be prevented using a variable displacement pump as a pump for driving a working unit. Interference of working is thereby prevented.

An engine speed control device for a motor grader according to a second aspect of the present invention relates to the engine speed control device for a motor grader according to the first aspect of the present invention. In the engine speed control device, the upper limit engine speed control unit is configured to set the upper limit engine speed to be the working-use upper limit engine speed at any one of the low speed stages regardless of which of a working state and an out-of-service state is set for a working unit.

According to the engine speed control device for a motor grader of the second aspect of the present invention, the upper limit engine speed is limited regardless of which of the working state and the out-of-service travelling state is set for the working unit in controlling the upper limit engine speed. Therefore, it is not required to determine the state of the working unit.

An engine speed control device for a motor grader according to a third aspect of the present invention relates to the engine speed control device for a motor grader according to the first aspect of the present invention. In the engine speed control device, the working-use upper limit engine speed is greater than or equal to 70% and less than or equal to 90% of a high idle engine speed.

Incidentally; it was found that the motor graders, mainly used for light load works, show very bad fuel consumption efficiency with respect to a work in executing a work by running the engine in an engine speed range greater than or equal to 90% of a high idle engine speed (i.e., an engine speed under a full-throttle load-free state). In view of this, the working-use upper limit engine speed is set to be less than or equal to 90% of the high idle engine speed in the present aspect of the present invention. Therefore, with the limitation of the upper limit engine speed, it is possible to avoid a work in an engine speed range with bad fuel consumption efficiency, and fuel consumption can be thereby improved.

Meanwhile, where the working-use upper limit engine sped is set to be lower than 70% of the high idle engine speed, an engine torque curve and a regulation line at the working-use upper limit engine speed tend to be matched on either a slightly higher engine speed side than the maximum torque point of the engine torque curve or a lower engine speed side than the maximum torque point of the engine torque curve. In view of this, the working-use upper limit engine speed is set to be greater than or equal to 70% of the high idle engine speed in the present aspect of the present invention. Therefore, occurrence of an engine stall and a hunting phenomenon can be inhibited even when the engine torque is increased in accordance with increase in an engine load.

An engine speed control device for a motor grader according to a fourth aspect of the present invention relates to the engine speed control device fix a motor grader according to the first aspect of the present invention. In the engine speed control device, the transmission has a plurality of automatically shiftable middle speed stages between the plural low speed stages and the high speed stage/stages. Further, the upper limit engine speed control unit is configured to set the upper limit engine speed to be an automatic-shifting-use upper limit engine speed at any one of the middle speed stages. The automatic-shifting-use upper limit engine speed is higher than the working-use upper limit engine speed and lower than the out-of-service travelling-use upper limit engine speed.

The automatically shiftable middle speed stages are herein set between the lower speed stages and the higher speed stage/stages. When the upper limit engine speed is set to be as low as the working-use upper limit engine speed at any one of the middle speed stages, chances are that automatic speed-stage shifting is not executed or smooth speed-stage shifting is not executed as a result of speed-stage shifting at a low engine torque. On the other hand, when the working-use upper limit engine speed is set to be high enough to prevent problems related to automatic speed-stage shifting, the effect of improving the fuel consumption is reduced in working at the low speed stages that consideration of automatic speed-stage shifting is unnecessary.

In view of this, according to the engine speed control device for a motor grader of the fourth aspect of the present invention, the upper limit engine speed is set to be the automatic-shifting-use upper limit engine speed, which is greater than the working-use upper limit engine speed and is lower than the out-of-service travelling-use upper limit engine speed, at the automatically shiftable middle speed stages. Therefore, automatic speed-stage shifting can be smoothly executed, and simultaneously fuel consumption can be improved.

An engine speed control device for a motor grader according to a fifth aspect of the present invention relates to the engine speed control device for a motor grader according to the fourth aspect of the present invention. In the engine speed control device, the automatic-shifting-use upper limit engine speed is higher than an engine speed at which automatic speed-stage shifting is executed. According to the speed controlling device tier a motor grader of the fifth aspect of the present invention, automatic speed-stage shifting can be reliably executed.

An engine speed control device for a motor grader according to a sixth aspect of the present invention relates to the engine speed control device for a motor grader according to the first aspect of the present invention. The engine speed control device further includes an accelerator pedal and accelerator opening degree detection unit. The accelerator pedal allows an operator to set an engine speed. The accelerator opening degree detection unit is configured to detect an accelerator opening degree set by the accelerator pedal. Further, the upper limit engine speed control unit is configured to set the upper limit engine speed to be the working-use upper limit engine speed at any one of the low speed stages by limiting an upper limit of an accelerator opening degree signal produced in accordance with the accelerator opening degree.

According to the speed control device tier a motor grader of the sixth aspect of the present invention, the upper limit engine speed control unit sets the upper limit engine speed to the working-use upper limit engine speed by limiting the upper limit of the accelerator opening degree signal.

An engine speed control device for a motor grader according to a seventh aspect of the present invention relates to the engine speed control device for a motor grader according to the first aspect of the present invention, in the engine speed control device, the motor grader is configured to change an operating mode of the engine between a power mode for using the engine at a high power and an economy mode for using the engine at a low power. The engine speed control device further includes engine mode determination unit. The engine mode determination unit is configured to determine which of the power mode and the economy mode is set as the operating mode of the engine. Further, the upper limit engine speed control unit is configured to execute the control only when the economy mode is set as the operating mode of the engine.

According to the engine speed control device for a motor grader of the seventh aspect of the present invention, the upper limit engine speed is not limited when the operation mode of the engine is set to be in the power mode. Therefore, reduction in work efficiency can be inhibited under heavy load.

A motor grader according to an eighth aspect of the present invention includes an engine, at least a pair of front and rear travelling wheels, a transmission, a working unit and the engine speed control device according to one of the first to seventh aspects of the present invention. The transmission has a plurality of manually shiftable low speed stages and at least a high speed stage. The transmission is configured to change and transmit power from the engine to at least either of the pair(s) of front and rear travelling wheels. Further, a matching torque point is set on a higher engine speed side than a maximum torque point of an engine torque curve. The matching torque point is herein set as an intersection between the engine torque curve and a regulation line where the upper limit engine speed is set to be the working-use upper limit engine speed.

According to the motor grader of the eighth aspect of the present invention, occurrence of an engine stall and a hunting phenomenon can be inhibited even when the engine speed is reduced in working.

A motor grader according to a ninth aspect of the present invention relates to the motor grader according to the eighth aspect of the present invention. In the motor grader, the engine torque curve is set for setting the maximum torque point to be closer to a low idle engine speed and for reducing a torque value in proportion to engine speed increase.

According to the motor grader of the ninth aspect of the present invention, a tolerance range for engine speed reduction due to engine load is widened. Therefore, occurrence of an engine stall and a hunting phenomenon can be inhibited. Further, the regulation line at the working-use upper limit engine speed can be set on a lower engine speed side. Fuel consumption can be thereby further improved in working.

A motor grader according to a tenth aspect of the present invention includes an engine, at least a pair of front and rear travelling wheels, a transmission, a torque converter, a working unit, an engine speed detection unit configured to detect an engine speed, a lock-up clutch control unit and the engine speed control unit according to one of the first to seventh aspects of the present invention. The transmission has a plurality of manually shiftable low speed stages and at least a high speed stage. The transmission is configured to change and transmit power from the engine to at least either of the pair(s) of front and rear travelling wheels. The torque converter includes a lock-up clutch. The torque converter is configured to transmit driving force from the engine to the transmission. The lock-up clutch control unit is configured to disengage the lock-up clutch when the engine speed becomes lower than or equal to a lock-up release engine speed set to be lower than the low idle engine speed while the lock-clutch is engaged.

According to the motor grader of the tenth aspect of the present invention, the lock-up clutch is disengaged when the vehicle speed is reduced and accordingly the engine speed becomes lower than or equal to the lock-up release engine speed less than the low idle engine speed. In other words, the engaged state of the lock-up clutch is kept until the engine speed reaches the lock-up release engine speed even when the engine speed is reduced and becomes lower than the low idle engine speed. Therefore, low speed travelling can be executed without losing a control feeling of an operator. Further, the engaged state of the lock-up clutch is released and switched into a released state when the engine speed becomes less than or equal to the lock-up release engine speed. Occurrence of an engine stall can be thereby avoided.

A motor grader according to an eleventh aspect of the present invention relates to the motor grader according to the tenth aspect of the present invention. In the motor grader, the torque converter further includes a damper configured to attenuate variation in torque from the engine. The lock-up release engine speed is higher than a resonance rotation speed of the damper.

According to the motor grader of the eleventh aspect of the present invention, the lock-up clutch is switched into the released state before the engine speed is reduced to the resonance rotation speed of the damper. It is thereby possible to avoid vibration of the vehicle body due to engine speed reduction.

A motor grader according to a twelfth aspect of the present invention relates to the motor grader according to the eighth aspect of the present invention. The motor grader further includes a transmission control section. The transmission control section is configured to control shifting of the speed stages by the transmission in accordance with a signal from a shift lever, an operating signal from a transmission mode switch, a vehicle speed and the engine speed.

According to the present invention as described above, fuel consumption of a motor grader can be effectively improved in working without reducing the maximum speed in out-of-service travelling.

BRIEF DESCRIPTION OF THE DRAWINGS

FIG. 7 is a table representing engine speed in automatic speed-stage shifting and upper limit engine speed at respective speed stages.

FIG. 8 is a table representing states of a lock-up clutch in both a manual speed-stage shifting mode and an automatic speed-stage shifting mode.

DETAILED DESCRIPTION OF THE EMBODIMENT

Overall Structure

Figure 1:
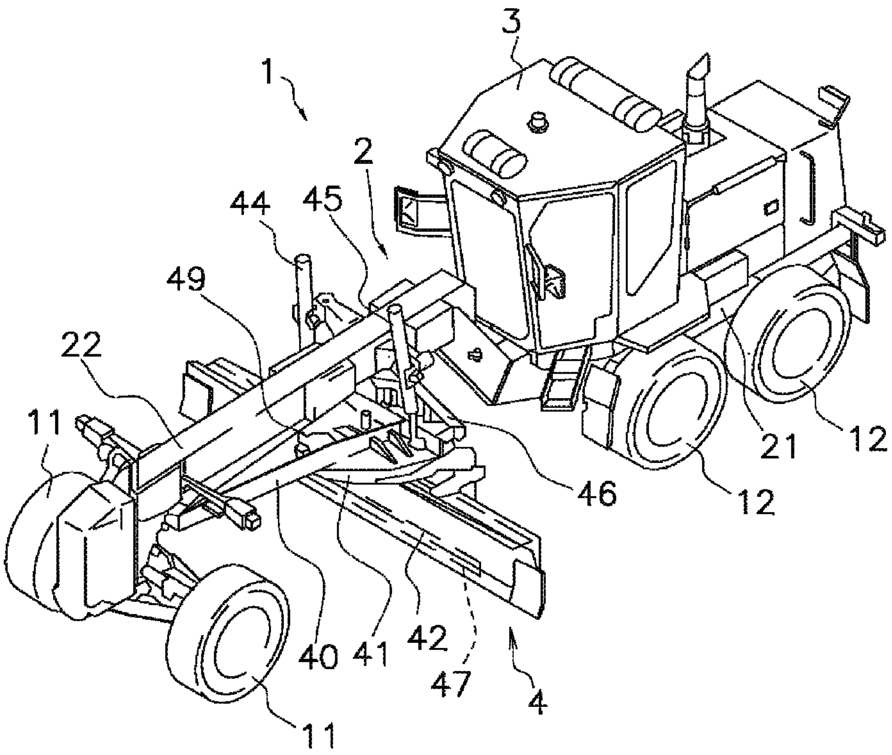
FIG. 1 is an external perspective view of a motor grader.
Figure 2:
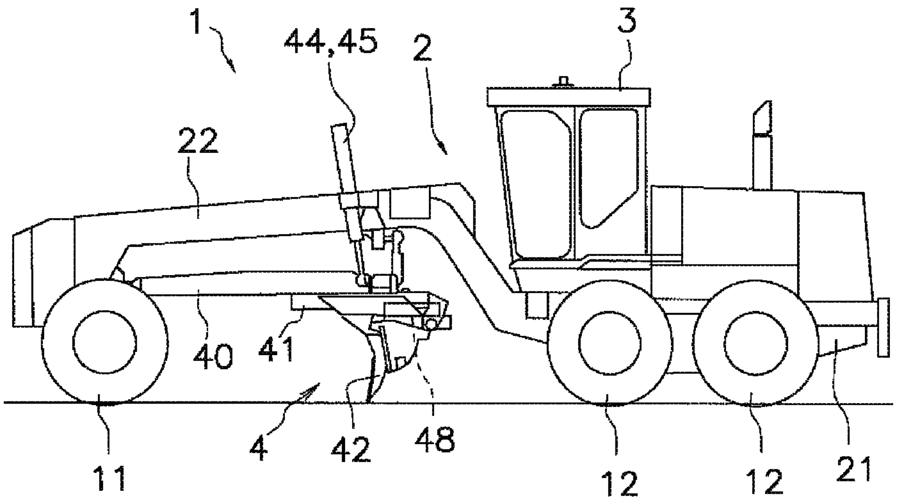
FIG. 2 is a side view of the motor grader.

FIG. 1 illustrates an external perspective view of a motor grader 1 according to an exemplary embodiment of the present invention, whereas FIG. 2 illustrates a side view of the motor grader 1. The motor grader 1 includes totally six travelling wheels. Specifically, the motor grader 1 includes a pair of a right front wheel 11 and a left front wheel 11, and two pairs of a tight rear wheel 12 and a left rear wheel 12 (i.e., two rear wheels 12 on each side). The motor grader 1 can execute a variety of works (e.g., leveling, snow removal, light cutting, material mixture and etc.) using a blade 42 disposed between the front wheels 11 and the rear wheels 12. It should be noted that FIGS. 1 and 2 illustrate only left-side ones of the four rear wheels 12.

Figure 3:
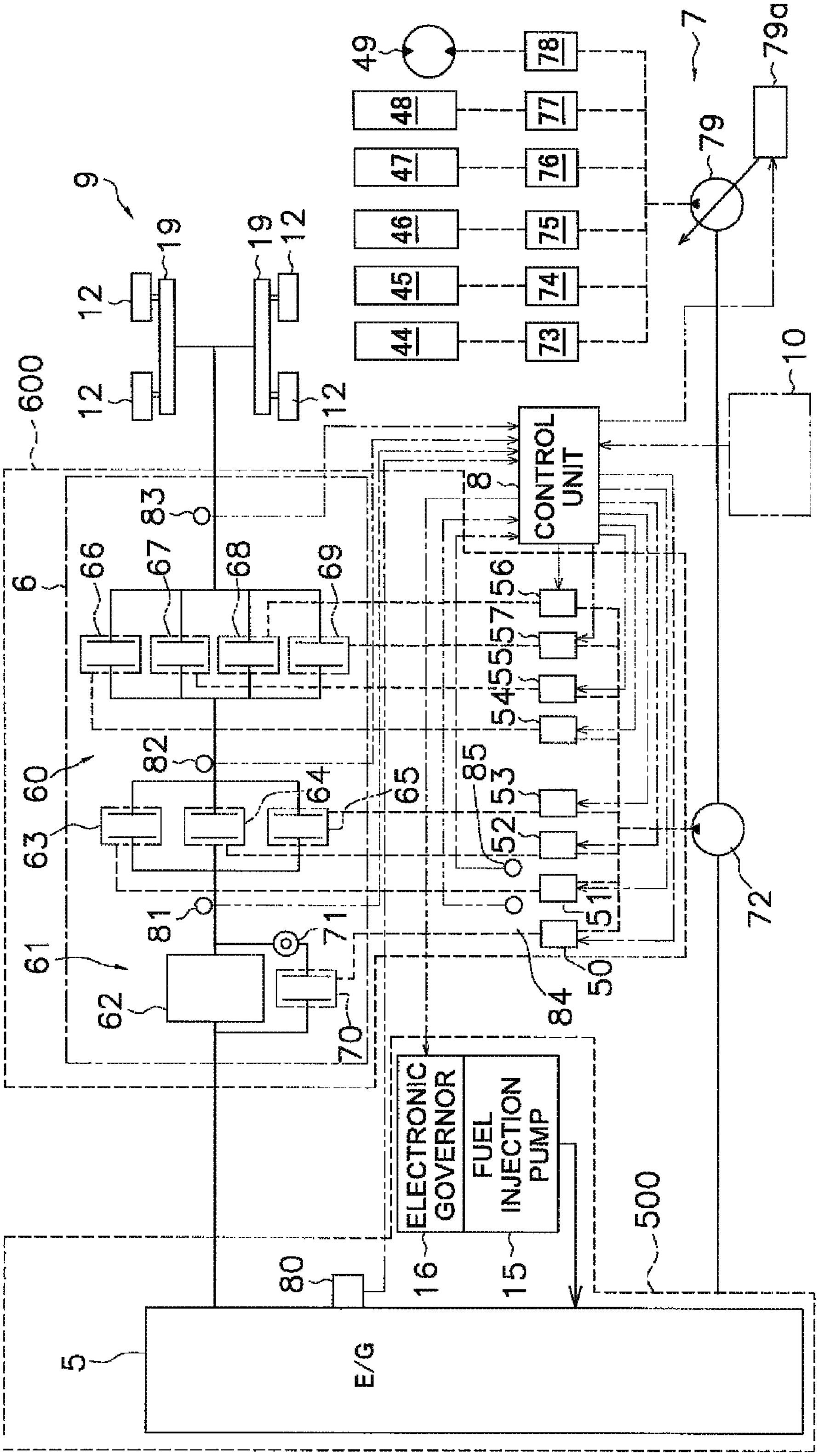
FIG. 3 is a block diagram representing a configuration of the motor grader.

As illustrated in FIGS. 1 and 2, the motor grader 1 includes a frame 2, a cab 3 and a working unit 4. As represented in FIG. 3, the motor grader 1 further includes an engine 5, a power transmission mechanism 6, a travel mechanism 9, a hydraulic drive mechanism 7, an operating unit 10, a control unit 6 and etc.

Frame 2 and Cab 3

As illustrated in FIGS. 1 and 2, the frame 2 is formed by a rear frame 21 and a front frame 22.

The rear frame 21 accommodates components represented in FIG. 3 such as the engine 5, the power transmission mechanism 6, the hydraulic drive mechanism 7 and etc. Further, the rear frame 21 is provided with the aforementioned four rear wheels 12. The rear wheels 12 are configured to be rotationally driven by means of driving force from the engine 5.

The front frame 22 is attached in front of the rear frame 21. The front wheels 11 are attached to the front end of the front frame 22.

The cab 3 is mounted on the rear frame 21. The can 3 accommodates an operating unit (see FIG. 5) in the inside thereof. The operating unit includes a handle, a shift lever, an operating lever for operating the working unit 4, a brake pedal, an accelerator pedal and etc. It should be noted that the cab 3 may be mounted on the front frame 22.

Working Unit 4

The working unit 4 includes a drawbar 40, a circle 41, the blade 42, a hydraulic motor 49, a variety of hydraulic cylinders 44 to 48 and etc.

The front end of the drawbar 40 is pivotably attached to the front end of the front frame 22. The rear end of the drawbar 40 is configured to be lifted up and down in conjunction with synchronous extension/contraction of a pair of lift cylinders 44 and 45. Further, the drawbar 40 is configured to pivot up and down about an axis arranged along a vehicle travel direction in conjunction with unsynchronous extension/contraction of the lift cylinders 44 and 45. Yet further, the drawbar 40 is configured to be shifted right and left in conjunction with extension/contraction of a drawbar shift cylinder 46.

The circle 41 is rotatably attached to the rear end of the drawbar 40. The circle 41 is configured to be driven by the hydraulic motor 49 (see FIG. 1). The circle 41 is configured to be rotated in a clockwise/counterclockwise direction with respect to the drawbar 40 seen from the above of the vehicle.

The blade 42 is supported while being slidable in a transverse direction with respect to the circle 41 and pivotable up and down about an axis arranged in parallel to the transverse direction. The term "transverse direction" herein refers to a right-and-left direction with respect to the vehicle travel direction. The blade 42 can be transversely moved with respect to the circle 41 by means of the blade shift cylinder 47 supported by the circle 41. Further, the blade 42 is configured to pivot about an axis arranged in parallel to the transverse direction with respect to the circle 41 by means of the tilt cylinder 48 (see FIG. 2) supported by the circle 41. The blade 42 can thereby change the orientation thereof with respect to the circle 41 in an up-and-down direction (i.e., a vertical direction). As described above, the blade 42 is allowed to perform the following actions through the drawbar 40 and the circle 40: upward and downward movements with respect to the vehicle; tilt change with respect to the travel direction; tilt change with respect to the transverse direction; rotation; and shift in the right-and-left direction.

The hydraulic motor 49 is configured to be driven by means of pressurized oil supplied thereto from a first hydraulic pump 79 to be described. In response, the hydraulic motor 49 is configured to drive the circle 41.

Engine 5

As represented in FIG. 3, the engine 5 is provided with a fuel injection pump 15. The fuel injection pump 115 is configured to supply fuel to the engine 5. The fuel supply amount to the engine 5 is configured to be controlled by a command signal to be outputted to an electronic governor 16 from the control unit 8 to be described. It should be noted that the rotation speed of the engine 5 is detected by an engine speed sensor 80 and is then transmitted to the control unit 8 as a detection signal. The control unit 8 is configured to transmit a command signal to the electronic governor 16 for controlling the fuel supply amount to the engine 5. The rotation speed of the engine 5 can be thereby controlled.

Power Transmission Mechanism 6

The power transmission mechanism 6 is a mechanism configured to transmit the driving force from the engine 5 to the rear wheels 12. The power transmission mechanism 6 includes a torque converter 61 and a transmission 60.

The torque converter oil is connected to the output side of the engine 5. The torque converter 61 is provided with a lock-up clutch 70. When the lock-up clutch 70 is set to be in an engaged state, an input-side member of the torque converter 61 and an input shaft of the transmission 60 are mechanically coupled to each other. The driving force from the engine 5 is thereby transmitted to the transmission 60 without intervention of a torque converter mechanism 62. When the engaged state of the lock-up clutch 70 is released and changed into the released state, driving force from the engine 5 is transmitted to the transmission 60 through the torque converter mechanism 62.

More specifically explained, the torque converter 61 includes the torque converter mechanism 62, the lock-up clutch 70 and a damper 71.

Figure 4:
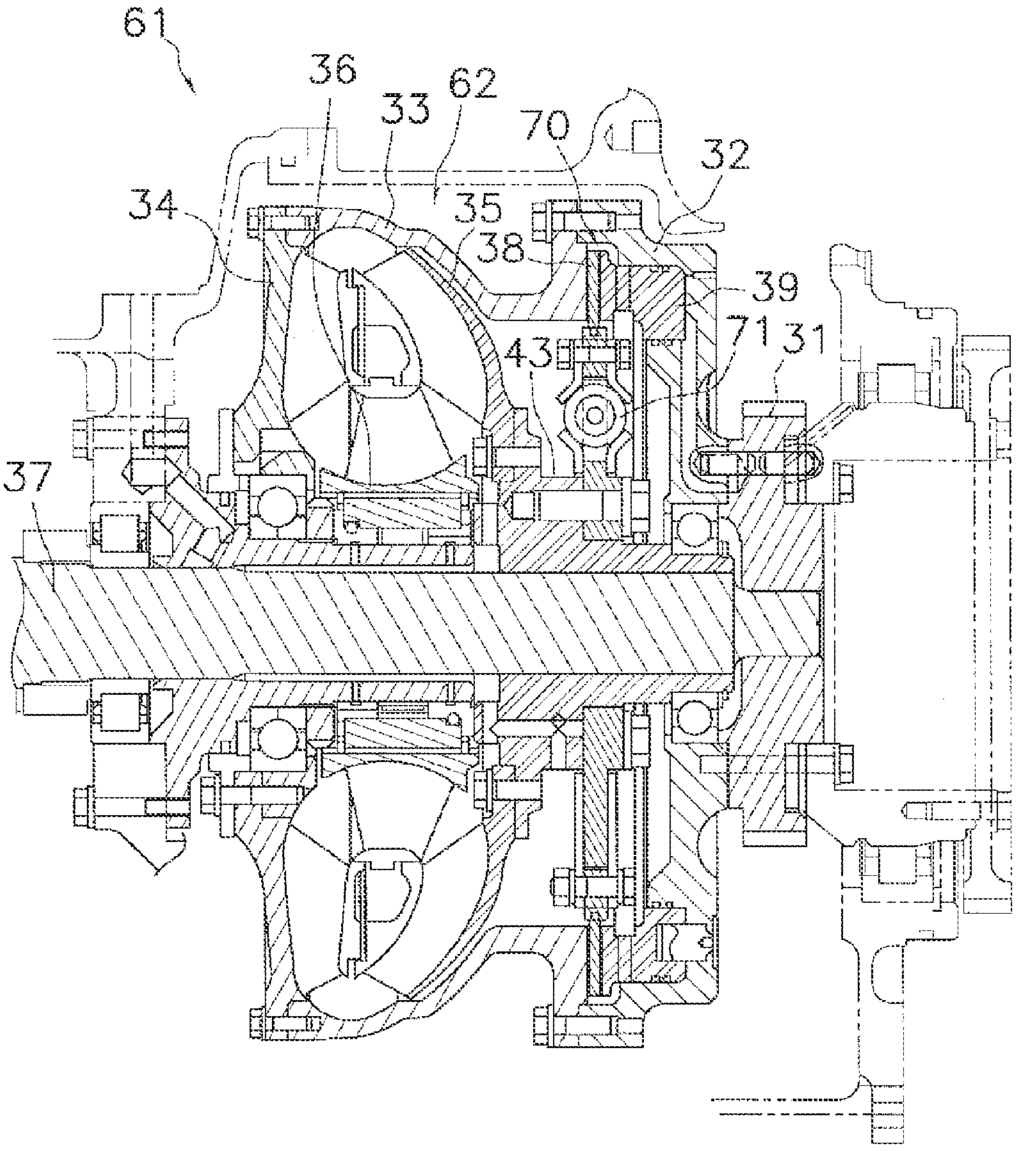
FIG. 4 is a cross-sectional view of a torque converter.

As illustrated in FIG. 4, the torque converter mechanism 62 includes an input part 31, a clutch housing 32, a drive casing 32, a pump 34, a turbine 35 and a stator 36. When the lock-up clutch 70 is set to be in the released state, the torque converter mechanism 62 is configured to function as a normal torque converter. Specifically, the driving force from the engine 5 is transmitted to the drive casing 33 through the input part 31 and the clutch housing 32. The drive casing 33 and the pump 34 are thereby unitarily rotated. The driving force, transmitted to the pump 34, is further transmitted to the turbine 35 by means of oil as medium. The driving force is subsequently transmitted from an output part 43 of the turbine 35 to an input shaft 37 of the transmission 60 coupled to the turbine 35. It should be noted that the front end (i.e., a right end in FIG. 4) of the input shaft 37 is supported by the input part 31 while being rotatable relatively thereto.

The lock-up clutch 70 includes a clutch disc 38 and a piston 39. The lock-up clutch 70 is set to be in the engaged state when the piston 39 is pressed onto the clutch disc 38. In this case, the driving force from the engine 5 is directly transmitted to the output part 13 of the turbine 35 through: the input part 31 and the clutch housing 32; the piston 39 and the drive casing 33; the clutch disc 38; and the damper 71. The driving force is subsequently transmitted from the output part 43 of the turbine 35 to the input shaft 37 of the transmission 60.

By contrast, the lock-up clutch 70 is set to be in the released state when the piston 39 and the clutch disc 38 are separated from each other.

The damper 71 is disposed between the clutch disc 38 and the turbine 35. The damper 71 is configured to inhibit vibration to be transmitted from the engine 5 to the input shaft 37 of the transmission 60 when the tock-up clutch 70 is set to be in the engaged state.

The transmission 60 includes hydraulic clutches 63 to 69, a plurality of transmission gears (not illustrated in the figures) and etc. More specifically; the transmission 60 includes the FL clutch 63 and the FH clutch 64 as clutches for forward travelling, the R clutch 65 as a clutch for rearward travelling, the 1st clutch 66, the 2nd clutch 67, the 3rd clutch 68 and the 4th clutch 69 as clutches provided for corresponding to the respective speed stages, in the forward travelling, any one of first to eighth forwards peed stages is selectable depending on a combination of either the FL clutch 63 or the FR clutch 64 and any one of the list to 4th clutches 66 to 69. In the rearward travelling, by contrast, any one of first to fourth speed stages is selectable depending on a combination of the R clutch 65 and any one of the 1st to 4th clutches 66 to 69.

It should be noted that an input shaft revolution sensor 81 is configured to detect revolution of an input shaft to be transmitted to the FL clutch 63 and the FH clutch 64, and the detected revolution is configured to be transmitted to the control unit 8 as a detection signal. Further, an intermediate shaft revolution sensor 82 is configured to detect revolution of an intermediate shaft between the FL and FH clutches 63 and 64 and the 1st to 4th clutches 66 to 69, and the detected revolution is configured to be transmitted to the control unit 8 as a detection signal. Yet further, an output shaft revolution sensor 83 is configured to detect revolution of the output shaft transmitted from the 1st to 4th clutches 66 to 69, and the detected revolution is configured to be transmitted to the control unit 8 as a detection signal.

Travel Mechanism 9

The travel mechanism 9 includes a final reducer (not illustrated in the figures), a tandem device 19 and the rear wheels 12. Driving force from the engine 5 is inputted into the travel mechanism 9 through the power transmission mechanism 6. Driving force, outputted from the transmission 60, is herein configured to be transmitted to the rear wheels 12 through the final reducer and the tandem device 19. The rear wheels 12 are thereby rotationally driven.

Hydraulic Drive Mechanism 7

The hydraulic drive mechanism 7 is a mechanism configured to produce hydraulic pressure by means of the driving force from the engine 5 for driving the aforementioned components including the various clutches 63 to 70, the hydraulic motor 49 and the various cylinders 44 to 48 by means of the produced hydraulic pressure. The hydraulic drive mechanism 7 includes the first hydraulic pump 79, a second hydraulic pump 72 and a variety of hydraulic control valves 73-78 and 50-57.

The first hydraulic pump 79 is driven by means of the driving force from the engine 5 for producing hydraulic pressure to be supplied to the various cylinders 44 to 48 and the hydraulic motor 49. The first hydraulic pump 79 is a variable displacement hydraulic pump and is configured to change the displacement of pressurized oil to be discharged therefrom in accordance with the tilt angle of a swash plate thereof to be changed by a pump displacement control cylinder 79*a*.

The second hydraulic pump 72 is driven by means of the driving force from the engine 5 for producing hydraulic pressure to be supplied to the various clutches 63 to 70.

The first to fifth cylinder control valves 73 to 77, the hydraulic motor control valve 78, the lock-up clutch control valve 50, the first to seventh clutch control valves 51 to 57 are electromagnetic proportional control valves configured to be electrically controlled by the control unit 8 for controlling the hydraulic pressure. Each of the first to fifth cylinder control valves 73 to 77 is configured to regulate hydraulic pressure to be supplied to a corresponding one of the aforementioned various cylinders 44 to 48. Further, the hydraulic pressure to be supplied to each of the various cylinders 44 to 48 is detected by a hydraulic sensor (not illustrated in the figures), and the detected hydraulic pressure is transmitted to the control unit 8 as a detection signal. The hydraulic motor control valve 78 is configured to regulate the hydraulic pressure to be supplied to the hydraulic motor 49. The lock-up clutch control valve 50 is configured to regulate the hydraulic pressure to be supplied to the lock-up clutch 70. Each of the first to seventh clutch control valves 51 to 57 is configured to regulate the hydraulic pressure to be supplied to a corresponding one of the various clutches 63 to 69.

Further, the hydraulic pressure to be supplied to the various clutches 63 to 70 is detected by a hydraulic sensor, and the detected hydraulic pressure is transmitted to the control unit 8 as a detection signal. It should be noted that FIG. 3 only represents a hydraulic sensor 84 configured to detect the hydraulic pressure to be supplied to the FL clutch 63 and a hydraulic sensor 85 configured to detect the hydraulic pressure to be supplied to the FH clutch 64 without representing the other hydraulic sensors.

Operating Unit 10

The operating unit 10 is a part operated by an operator for controlling travelling of the motor grader 1 and actions of the working unit 4. As illustrated in an enlarged diagram of FIG. 5, the operating unit 10 includes a variety of operating members, such as an accelerator pedal 13, a shift lever 14, an engine mode switch 17, a transmission mode switch 18 and a momentary-type second accelerator switch 20. The accelerator pedal 13 is an operating member for setting the engine speed to be a desired engine speed. The accelerator pedal 13 is provided with a sensor 13*a* for detecting the pressed-down amount thereof, i.e., the acceleration opening degree. The shift lever 14 is an operating member for executing speed-stage shifting of the transmission 60. The shift lever 14 is configured to select any one of the speed stages F1 to F8 for forward travelling and the speed stages R1 to R4 for rearward travelling in accordance with the position thereof. The engine mode switch 17 is a switch for switching the operation mode of the engine between an economy mode and a power mode. The economy mode focuses on saving of fuel consumption whereas the power mode focuses on power. The transmission mode switch 18 is a switch for switching speed-stage shifting of the transmission 60 between a manual speed-stage shifting mode and an automatic speed-stage shifting mode.

In the manual speed-stage shifting mode, manual speed-stage shifting is allowed at all the speed stages and the transmission 6 keeps the speed stage identical to that selected by the shift lever 14.

In the automatic speed-stage shifting mode, automatic speed-stage shifting is allowed at the fourth speed stage for forward travelling or higher. In other words, speed stages are automatically switched while the speed stage selected by the shift lever 14 is set as the upper limit. In the present exemplary embodiment, automatic speed-stage shifting is executed when a speed stage higher than or equal to a speed stage F5 is selected by the shift lever 14. In automatic speed-stage shifting, the vehicle starts moving at a speed stage F4 and automatic speed-stage shifting is executed in a range from the speed stage F4 to the selected speed stage.

The second accelerator switch 20 is a switch for setting the minimum engine speed of the engine 5. The set engine speed is configured to be increased or reduced by e.g., 100 rpm when either of two parts of the second accelerator switch 20 is pressed. When any of the operating members of the operating unit 10 is operated, an operating signal corresponding to the operation is transmitted to the control unit 8.

Control Unit 8

Figure 5:
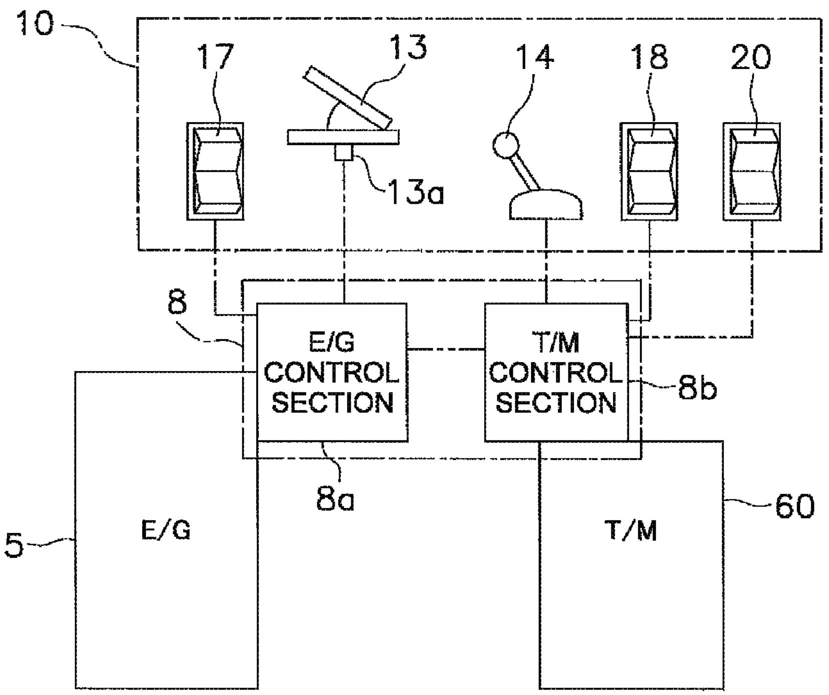
FIG. 5 is a block diagram representing an operating unit and a control unit of the motor grader.

As illustrated in FIGS. 3 and 5, the control unit 8 includes an engine control section 8*a* and a transmission control section 8*b*. The control unit 8 is configured to control an engine part 500 and a transmission part 600 based on an operating signal from the operating unit 10 and detection signals from a variety of sensors. Further, the control unit 8 can control the working unit 4 as well as the engine part 500 and the transmission part 600 by controlling the first to fifth cylinder control valves 73 to 77 and the hydraulic motor control valve 78. For example, the control unit 8 is configured to transmit a signal to each of the first and second cylinder control valves 73 and 74 for controlling the hydraulic pressure to be supplied to each of the lift cylinders 44 and 45. The blade 42 can be thereby moved in the vertical direction.

The engine control section 8*a* is configured to determine the amount of fuel to be supplied to the engine 5 based on an accelerator opening signal from the accelerator pedal 13 and an engine speed detected by the engine speed sensor 80. Further, the engine control section 8*a* is configured to transmit a command signal corresponding to the determined fuel supply amount to the electronic governor. The amount of fuel to be injected from a fuel injection pump is accordingly regulated to be matched with the operating amount of the accelerator pedal 13. The engine speed is thereby controlled. Further, an operator can control the output of the working unit 4 and the vehicle speed. Yet further, the engine control section 8*a* is configured to selectively switch the engine mode between the economic mode and the power mode based on an operating signal from the engine mode switch 17.

Further, the engine control section 8*a* has a function as an upper limit engine speed control unit. It should be noted that a processing of controlling the upper limit engine speed will be described below in detail.

The transmission control section 8*b* is configured to transmit a command signal to the lock-up clutch control valve 50 for increasing or reducing the hydraulic pressure of the lock-up clutch 70. The lock-up clutch 70 can be thereby switched between the engaged state and the released state.

Further, the transmission control section 8*b* is configured to selectively switch the speed-stage shifting mode of the power transmission mechanism 6 between the manual speed-stage shifting mode and the automatic speed-stage shifting mode based on an operating signal from the transmission mode switch 18. Yet further, the transmission control section 8*b* can recognize the operating position of the shift lever 14 based on a signal from the shift lever 14. In the manual speed-stage shifting mode, speed-stage shifting of the transmission 60 can be manually executed at all the speed stages for both forward and rearward travelling in conjunction with an operator's operation of the shift lever 14. It should be noted that the lock-up clutch 70 is herein set to be in the engaged state as illustrated in FIG. 8. In the automatic speed-stage shifting mode, by contrast, the respective clutch control valves are controlled and speed-stage shifting of the transmission 60 is automatically executed at the fourth to eighth speed stages for forward travelling in response to the vehicle speed and the engine speed. It should be noted that manual speed-stage shifting is required for the lower speed stages (i.e., the first to third speed stages for forward travelling) by operating the shift lever 14 even when the automatic speed-stage shifting mode is selected. In the automatic speed-stage shifting mode, the lock-up clutch 70 is constantly set to be in the released state at the lower speed stages requiring automatic speed-stage shifting. By contrast, the lock-up clutch 70 is basically set to be in the released state at the fifth or higher speed stages for forward travelling in the automatic speed-stage shifting mode. However, the lock-up clutch 70 is automatically switched into the engaged state when slippage of the torque converter mechanism 62 is reduced in proportion to magnitude of the vehicle speed.

Further, the transmission control section 8*b* can execute an engine stall avoiding control for avoiding occurrence of engine stall at a lower speed travelling in the manual speed-stage shifting mode. The engine stall avoiding control will be described below.

Upper Limit Engine Speed Control

The upper limit engine speed control by the engine control section 8*a* will be hereinafter explained. The upper limit engine speed of the engine 5 is herein controlled depending on a speed stage in forward travelling.

Specifically; when any one of the high speed stages (i.e., one of the seventh and eighth speed stages for forward travelling) is selected, the rated maximum engine speed (high idle engine speed) is set as an out-of-service travelling-use upper limit engine speed. In other words, no limitation is imposed on the upper limit engine speed. Further, when any one of the low speed stages (i.e., one of the first to third speed stages for forward travelling) is selected, the upper limit engine speed is set to be a working-use upper limit engine speed that is lower than the maximum engine speed. Yet further, when any one of the middle speed stages (i.e., one of the fourth to sixth speed stages for forward travelling) is selected, the upper limit engine speed is set to be an automatic-shifting-use upper limit engine speed that is higher than the working-use upper limit engine speed and is lower than the maximum engine speed.

The automatic-shifting-use upper limit engine speed is herein set as an engine speed higher than the highest one of the engine speeds at which automatic speed-stage shifting is executed at the respective speed stages, and is determined based on a target fuel consumption. On the other hand, the working-use upper limit engine speed is set to be in a range of 70 to 90% of the high idle engine speed, while a matching torque point, i.e., an intersection between a regulation line and an engine torque curve at the working-use upper limit engine speed, is located on a higher engine speed side than the maximum torque point of the engine torque curve.

As an example, the automatic-shifting-use upper limit engine speed is set to be 2000 rpm where the high idle engine speed (i.e., the out-of-service travelling-use upper limit engine speed) is set to be 2200 rpm and a speed stage is shifted up at an engine speed ranging from 1700 to 2000 rpm at each of the fourth to sixth speed stages for forward travelling with the accelerator pedal being fully pressed down. The setting prevents occurrence of a trouble that automatic speed-stage shifting is not executed due to limitation of the upper limit engine speed. It should be noted that the seventh speed stage for forward travelling is shifted up to the eighth speed stage for forward travelling at 2000 rpm or greater (e.g., 2075 rpm). In this case, the upper limit engine speed is set to be 2200 rpm at the seventh and eighth speed stages for forward travelling. Therefore, automatic speed-stage shifting is herein smoothly executed similarly to the above. On the other hand, the working-use upper limit engine speed is set to be 1800 rpm. When any one of the low speed stages is herein selected, the upper limit engine speed is set to be the working-use upper limit engine speed regardless of a state of the working unit (i.e., either a working state or an out-of-service travelling state). With the extended/contracted amount of the cylinder rods of the lift cylinders 44 and 45 detected by stroke sensors, for instance, the state of the working unit (i.e., either the working state or the out-of-service travelling state) can be herein determined based on either the extent of the depth that the blade, configured to be moved up and down in conjunction with extension and contraction of the cylinder rods of the lift cylinders 44 and 45, is stuck into the ground or the extent of the height that the blade is lifted up from the ground. In other words, it is possible to determine the state of the working unit (i.e., either the working state or the out-of-service travelling state) based on the height of the blade.

Figure 6:
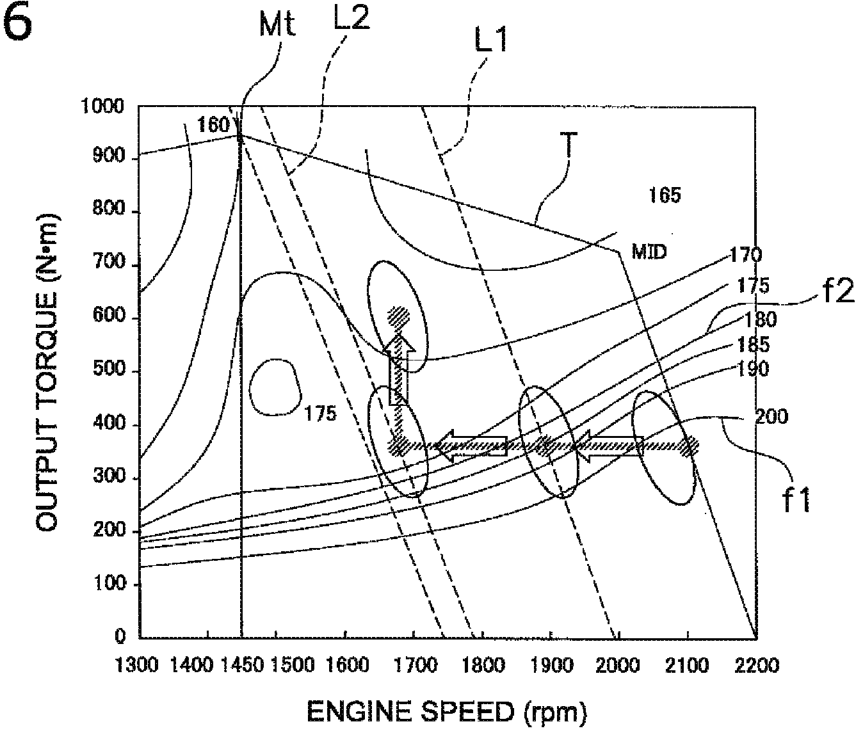
FIG. 6 is a chart representing output torque and fuel consumption rate with respect to engine speed.

FIG. 6 represents the aforementioned relation between the respective upper limit engine speeds and the engine torque curve. In FIG. 6, a characteristic T is an engine output torque curve where the high idle engine speed is set to be 2000 rpm. When the matching torque is herein set to be 400 N·m without limiting the upper limit engine speed, the fuel consumption rate is 200 mg/ps/h (see a fuel consumption rate curve f1) in working with the accelerator pedal being fully pressed down. When fuel consumption enhancement of 10% is aimed under the condition, the fuel consumption rate is required to be 180 mg/ps/h (see a fuel consumption rate curve f2) in the aforementioned condition. In this case, a line L1 depicted with a broken line in FIG. 6 is produced as the regulation line and the upper limit engine speed is set to be 2000 rpm. In other words, the upper limit engine speed is required to be limited to 2000 rpm for achieving 10% enhancement of fuel consumption rate. As described above, the working-use upper limit engine speed is set while the matching torque point, which is the intersection between the regulation line and the engine torque curve T at the working-use upper limit engine speed, is located on a higher engine speed side than the maximum torque point of the engine torque curve (see Mt in FIG. 6). Therefore, in the present exemplary embodiment, the regulation line at the working-use upper limit engine speed is set to be a line L2 plotted in FIG. 6 and the working-use upper limit engine speed is accordingly set to be 1800 rpm.

FIG. 7 represents the upper limit engine speeds set as described above for the respective speed stages together with the engine speeds set for shifting up or down a speed stage in automatic speed-stage shifting. As represented in FIG. 7, the upper limit engine speed (i.e., the working-use upper limit engine speed) is set to be 1800 rpm at the lower speed stages (i.e., the first to third speed stages for toward travelling). Further, the upper limit engine speed (i.e., the automatic-shifting-use upper limit engine speed) is set to be 2000 rpm at the middle speed stages (i.e., the fourth to sixth speed stages for forward travelling) that the automatic speed-stage shifting is executed. Yet further, the upper limit engine speed is set to be 2200 rpm (i.e., no limitation is imposed on the upper limit engine speed) at the high speed stages (i.e., the seventh and eighth speed stages for forward travelling).

In FIG. 7, "FULL" indicates the fully opened accelerator opening deer, whereas "IDLE" indicates a state of the accelerator pedal that is not pressed down at all. On the other hand, "PARTIAL" indicates a transition state between the state of the accelerator pedal that is fully pressed down and the state of the accelerator pedal that is not pressed down at all. Further, the field of "SHIFT UP" represents the engine speed in automatically shifting each speed stage up to an immediately higher speed stage, whereas the field of "SHIFT DOWN" represents the engine speed in shifting each speed stage down to an immediately lower speed stage.

As is obvious from FIG. 7, at each speed stage tier executing automatic speed-stage shifting, the upper limit engine speed is definitely set to be higher than the engine speed set for executing automatic speed-stage shifting. The setting prevents occurrence of a trouble that automatic speed-stage shifting is not executed due to limitation of the maximum engine speed.

Processing Flow of Upper Limit Engine Speed Control

Figure 9:
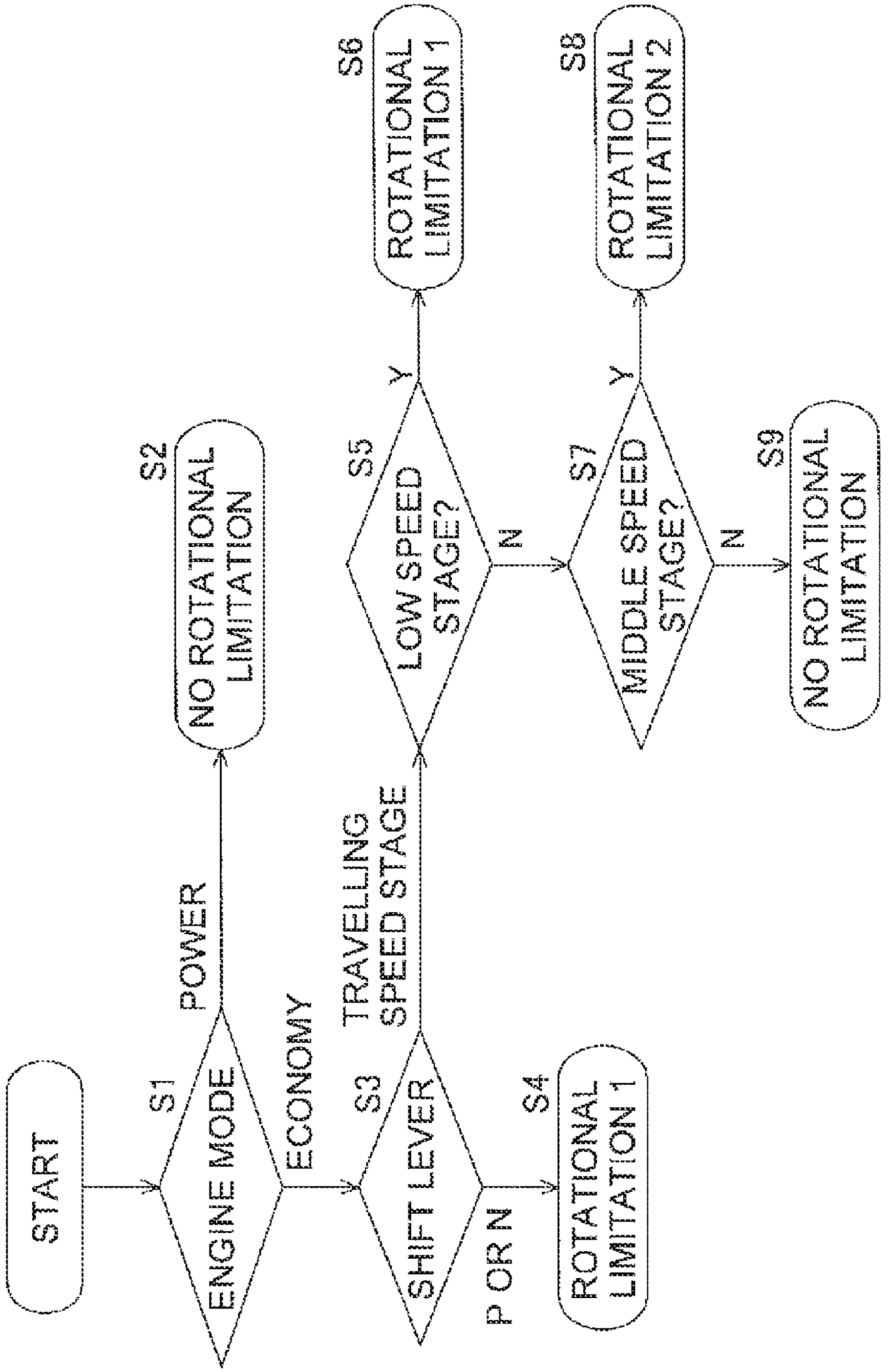
FIG. 9 is a flowchart of an upper limit engine speed control.

A processing of controlling the upper limit engine speed will be explained based on flowcharts represented in FIGS. 9 and 10. It should be noted that only the processing of controlling the upper limit engine speed will be hereinafter explained without explaining the other processing such as a processing of speed-stage shifting control. It should be also noted that the flowcharts of FIGS. 9 and 10 represent processing to be executed by both of the engine control section 8*a* and the transmission control section 8*b* without distinguishing processing to be executed by the engine control section 8*a* and that to be executed by the transmission control section 81) from each other.

In Step S1, it is determined which of the following is currently set as the engine mode: the power mode; and the economy mode. When it is determined in Step S1 that the engine mode is set to be the power mode, the processing proceeds to Step S2 and a flag "no rotational limitation" is set as a control processing flag (to be described). In this case, no limitation is imposed on the upper limit engine speed and a preliminarily set high idle engine speed is kept set as the upper limit engine speed. Therefore, the setting does not cause any troubles for working and travelling.

When it is determined in Step S1 that the economy mode is currently set, on the other hand, the processing proceeds to Step S3. In Step S3, it is determined which of the following is true as the current position of the shift lever 14: any of the travelling speed stage positions; and either a parking position (P) or a neutral position (N). When it is determined in Step S3 that the shift lever 14 is currently positioned in either the parking position or the neutral position, the processing proceeds to Step S4 and a flag "rotational limitation 1" is set as a control processing flag.

Figure 10:
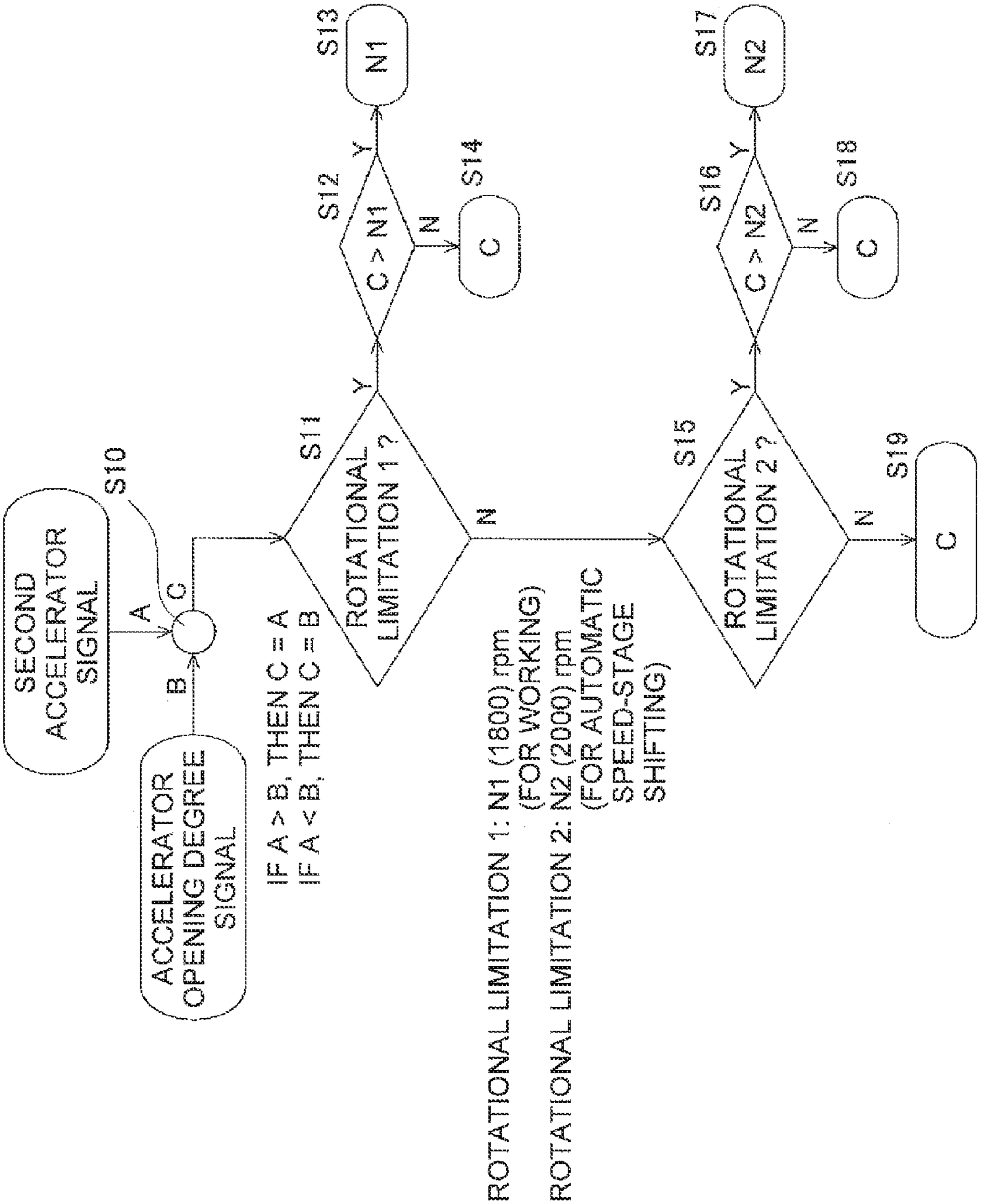
FIG. 10 is a flowchart of the upper limit engine speed control.

The control processing flags herein refer to flags for determining which of the following is executed for the upper limit engine speed in the control processing of FIG. 10: no limitation; limitation to a working-use upper limit engine speed N1 (1800 rpm); and limitation to an automatic-shifting-use upper limit engine speed N2 (2000 rpm).

When it is determined in Step S3 that the shift lever 14 is currently set to be in any one of the travelling speed stages, the processing proceeds to Step S5. In Step S5, it is determined whether or not any of the low speed stages (i.e., the first to third speed stages) is currently selected. When it is determined in Step S5 that any one of the low speed stages is currently selected, the processing proceeds to Step S6 and the flag "the rotation limitation 1" is set as a control processing flag. When it is determined in Step S5 that a speed stage except for the low speed stages is currently selected, the processing proceeds to Step S7. In Step S7, it is determined whether or not any one of the middle speed stages (i.e., the fourth to sixth speed stages) is currently selected. When it is determined in Step S7 that any one of the middle speed stages is currently selected, the processing proceeds to Step S8 and a flag "rotational limitation 2" is set as a control processing flag. When it is determined in Step S7 that any one of the middle speed stages is not currently selected, i.e., when any one of the high speed stages (i.e., the seventh and eighth speed stages) is currently selected as a speed stage, the processing proceeds to Step S9. In Step S9, the flag "no rotational limitation" is set as a control processing flag.

After the control processing flags for the upper limit engine speed control are set as described above, a second accelerator signal (A) and an accelerator opening degree signal (B) are compared and the larger one (C) of them is outputted in Step S10 of FIG. 10. Specifically, the minimum engine speed set by an operator (i.e., the second accelerator signal) and the engine speed set by the pressed-down amount of the accelerator pedal 13 (i.e., the accelerator opening degree signal) are compared. When the minimum engine speed set by an operator (i.e., the second accelerator signal) is greater than the other (A>B), the one (C) instructed as the engine speed is determined to be the minimum engine speed (A). When the engine speed set by the accelerator pedal 13 is greater than the other (B>A), the one (C) instructed as the engine speed is determined to be the engine speed (B) set by the accelerator pedal 13.

Next in Step S11, it is determined whether or not "the rotational limitation 1" is set as a control processing flag. When it is determined in Step S11 that "the rotational limitation 1" is set as a control processing flag, the processing proceeds to Step S12. In Step S12, it is determined whether or not the instructed engine speed C is greater than the working-use upper limit engine speed N1. When it is determined in Step S12 that the instructed engine speed C is greater than the working-use upper limit engine speed N1, the processing proceeds to Step S13 and the instructed engine speed C is limited to the working-use upper limit engine speed N1. When it is determined in Step S12 that the instructed engine speed C does not reach the working-use upper limit engine speed N1, by contrast, the processing proceeds to Step S14 and the instructed engine speed C is set as the engine speed for the engine speed control without any changes.

On the other hand, when it is determined in Step S11 that "the rotational limitation 1" is not set as a control processing flag, the processing proceed to Step S15. In Step S15, it is determined whether or not "the rotational limitation 2" is set as a control processing flag. When it is determined in Step S15 that "the rotational limitation 2" is set, the processing proceeds to Step S16. In Step S16, it is determined whether or not the instructed engine speed C is greater than the automatic-shifting-use upper limit engine speed N2. When it is determined in Step S16 that the instructed engine speed C is greater than the automatic-shifting-use upper limit engine speed N2, the processing proceeds to Step S17 and the instructed engine speed C is limited to the working-use upper limit engine speed N2. On the other hand, when it is determined in Step S16 that the instructed engine speed C does not reach the working-use upper limit engine speed N2, the processing proceeds to Step S18 and the instructed engine speed C is set as the engine speed for the engine speed control without any changes.

When it is determined in Step S15 that neither "the rotational limitation 1" nor "the rotational limitation 2" is not set as a control processing flag, the processing proceeds to Step S19 and the instructed engine speed C is set as the engine speed for the engine speed control without any changes.

Advantageous Effects of Upper Limit Engine Speed Control (1) With reference to FIG. 6, where the matching torque is set to be 400 N·m at the low speed stages, the fuel consumption rate is roughly 200 mg/ps/h when no limitation is imposed on the upper limit engine speed. When the upper limit engine speed is set to be the working-use upper limit engine speed under the same condition as described in the present exemplary embodiment, the fuel consumption rate is set to be roughly 173 mg/ps/h plotted in the vicinity of the intersection between an output torque of 400 N·m and the regulation line L2. Now, the upper limit engine speed is herein limited from 2200 rpm to 1800 rpm. Therefore, the maximum speed is herein reduced than that of the well-known devices by that much. Accordingly, an operator is going to shift up the speed stage for achieving a higher speed (equivalent to that achieved by the well-known devices). In other words, an operator is encouraged to shift up the speed stage in response to limitation of the upper limit engine speed. When the speed stage is shifted up, the required engine torque is increased. In the present exemplary embodiment, saving of fuel consumption is achieved by simply limiting the upper limit engine speed not by reducing engine torque. In other words, the engine torque can be still increased. Therefore, the matching torque is set to be 600 N·m greater than that of the well-known devices. In this case, the fuel consumption rate is set to be roughly 167 mg/ps/h. In short, the fuel consumption can be improved.

As described above, fuel consumption can be much improved in working at the low speed stages, compared to the case that no limitation is imposed on the upper limit engine sopped. Further, the upper limit engine speed is also limited to the automatic-shifting-use upper limit engine speed at the middle speed stages. Therefore, fuel consumption can be improved similarly to the above.

(2) The automatic-shifting-use upper limit engine speed is set to be higher than the engine speeds for automatic speed-stage shifting at the respective speed stages. Therefore, troubles do not occur, including a trouble that automatic speed-stage shifting is not executed even when the upper limit engine speed is limited.

(3) The regulation line at the working-use upper limit engine speed is set on a higher engine speed side than the maximum torque point of the engine torque curve. Therefore, occurrence of an engine stall or a hunting phenomenon can be inhibited even when the upper limit engine speed is limited in working.

(4) No limitation is herein imposed on the upper limit engine speed at the high speed stages. Therefore, it is possible to reliably achieve the maximum speed equivalent to that of the well-known devices. Further, an out-of-service travelling time is not increased.

(5) The upper limit engine speed is set to be the working-use upper limit engine speed at the low speed stages, regardless of the state of the working unit (i.e., the working state or the out-of-service travelling state). Therefore, it is not required to determine the state of the working unit (i.e., the working state or the out-of-service travelling state) in controlling the upper limit engine speed.

(6) The upper limit engine speed is not limited when the engine mode is set to be in the power mode. Therefore, degradation in working efficiency can be inhibited in the application of heavy load.

(7) The upper limit engine speed is limited to the working-use upper limit engine speed when the shift lever is operated and set to be in either the parking position or the neutral position. Therefore, fuel consumption can be inhibited when an operator habitually performs an unnecessary acceleration operation.

Engine Stall Avoiding Control

Under the engine stall avoiding control, the control unit 8 is configured to keep the state of the lock-up clutch 70 when the engine speed is higher than a predetermined lock-up release engine speed while the lock-up clutch 70 is set to be in the engaged state. The lock-up release engine speed can be uniquely set for each of the speed stages. The lock-up release engine speed is lower than the low idle engine speed but is higher than the resonance rotation speed of the damper 71. Resonance of the damper 71 is caused by relations among the damper 71, engine output torque and inertia. The vehicle body is vibrated by excessive resonance torque. Further, the excessive resonance torque deteriorates durability of the drive train. Depending on relations among the damper 71, engine output torque and inertia, resonance of the damper may not be caused until an engine stall occurs and therefore excessive resonance torque may not be produced. In this case, the lock-up release rotation speed may be arbitrarily set in consideration of operability as long as it is lower than the low idle engine speed and is higher than the engine speed immediately before occurrence of an engine stall. Further, the present control can be even applied to the power transmission mechanism 6 embedded with the torque converter 61 without the damper 71 by arbitrarily setting the lock-up release engine speed in consideration of operability as long as it is lower than the low idle engine speed and is higher than the engine speed immediately before occurrence of an engine stall.

Under the engine stall avoiding control, the lock-up clutch 70 is configured to be kept in the engaged state until the engine speed reaches the lock-up release engine speed even when the engine speed is reduced to the low idle engine speed or less. The control unit 8 is configured to switch the lock-up clutch 70 into the released state when the engine speed is further reduced to the lock-up release engine speed or less.

Figure 11:
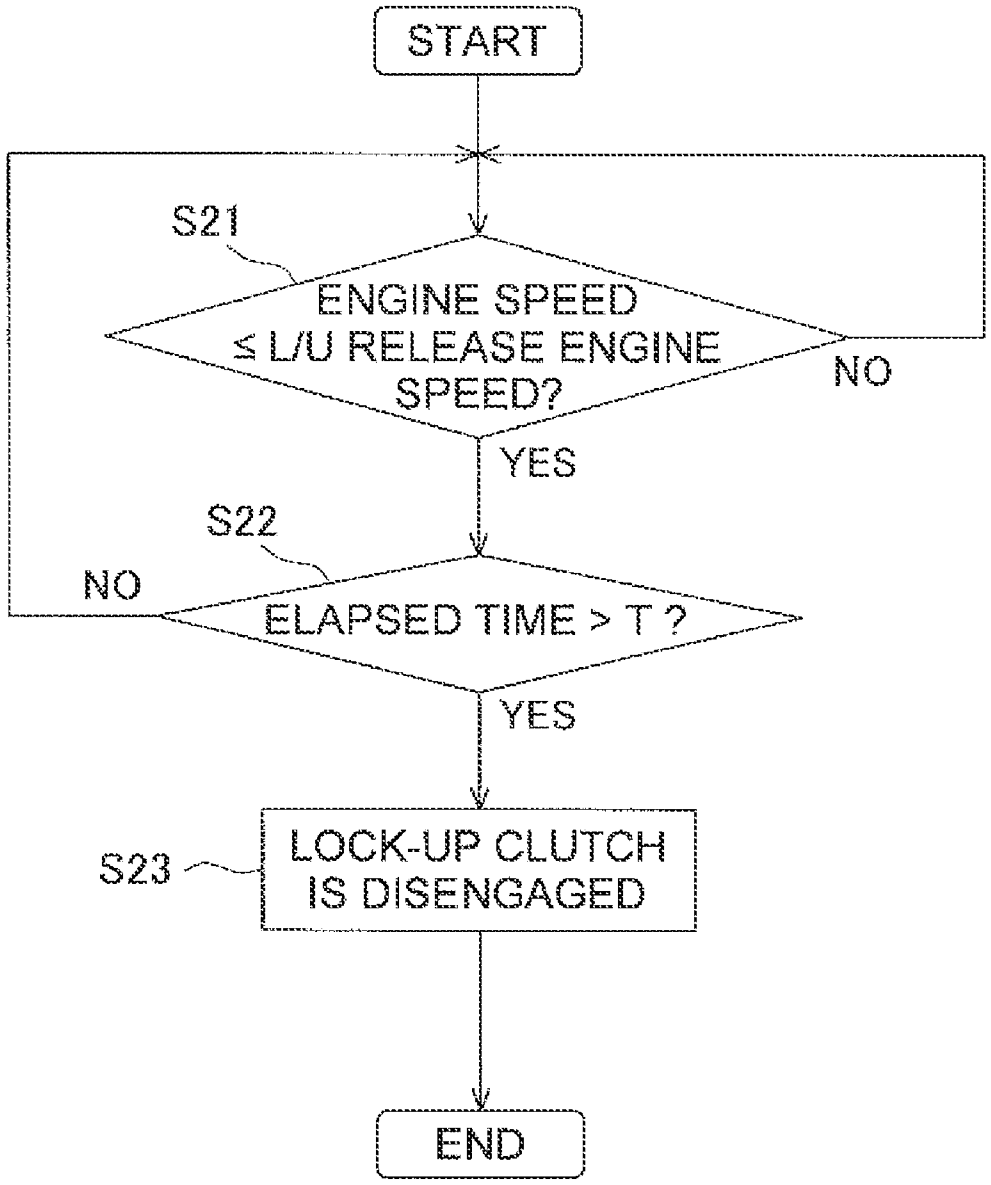
FIG. 11 is a flowchart of an engine stall avoiding control.

More specifically; it is firstly determined in Step S21 whether or not the engine speed is less than or equal to the lock-up release engine speed as represented in FIG. 11. When it is determined in Step S21 that the engine speed is less than or equal to the lock-up release engine speed, it is then determined in Step S22 whether or not an elapsed time is greater than a predetermined period of time T. In other words, it is herein determined whether or not a period of time, elapsed since the engine speed becomes less than or equal to the lock-up release engine speed, exceeds the predetermined period of time T. The predetermined period of time T is herein a short period of time, for instance, roughly tens of milliseconds. The predetermined period of time T is set for purposes such as avoidance of erroneous detection by the engine speed sensor 80. When it is determined in Step S23 that the elapsed time exceeds the predetermined period of time T, the lock-up clutch 70 is switched into the released state.

When the lock-up clutch 70 is switched into the released state under the engine stall avoiding control and then predetermined returning conditions are all satisfied, the control unit 8 is configured to return the lock-up clutch 70 to the engaged state. For example, the returning conditions include the following first to third returning conditions.

The First Returning Condition: the Input Shaft Rotation Speed of the Transmission 60≧a Returning Engine Speed Setting Value.

In the first returning condition, "The input shaft rotation speed of the transmission 60" is detected by the input shaft revolution sensor 81. "The returning engine speed setting value" is a predetermined constant uniquely set for each of the speed stages. Further, "the returning engine speed setting value" is preferably set to be a predetermined engine speed higher than the low idle engine speed. The configuration aims at preventing the lock-up clutch 70 from being set to be in the released state under the engine stall avoiding control immediately after the lock-up clutch 70 is returned to the engaged state.

The Second Returning Condition: the Elapsed Time>a Returning Prevention Time Setting Value In the second returning condition, "the elapsed time" herein refers to a period of time elapsed after the first returning condition is satisfied. On the other hand, "the returning prevention time setting value" is a predetermined constant to be determined in consideration of hunting prevention.

The Third Returning Condition: a L/U Relative Rotation Speed<a Released State Keeping Setting Value In the third returning condition, "the L/U relative rotation speed" refers to a relative rotation speed between the input-side rotation speed and the output-side rotation speed in the lock-up clutch 70. Therefore, "the L/U relative rotation speed" can be calculated based on the difference between the engine speed and the input-shaft rotation speed of the transmission 60. "The released state keeping setting value" is a predetermined constant to be determined in consideration of protection of the lock-up clutch 70 and shock to be caused in engaging the lock-up clutch 70.

It should be noted that either the intermediate shaft rotation speed of the transmission 60 (to be detected by the intermediate shaft revolution sensor 82) or the output shaft rotation speed of the transmission 60 (to be detected by the output shaft revolution sensor 83) may be used instead of the input shaft rotation speed of the transmission 60 in the first returning condition. Alternatively, the engine speed may be used. When either the intermediate shaft rotation speed or the output shaft rotation speed is herein used, "the returning rotation speed setting value" can be determined in consideration of the gear ratio of the transmission 60. When the engine speed is herein used, on the other hand, "the returning rotation speed setting value" can be determined in consideration of the LILT relative rotation speed.

Advantageous Effects of Engine Stall Avoiding Control

According to the motor grader 1, occurrence of an engine stall and vibration of vehicle body are avoided under the engine stall avoiding control even when the engine speed is reduced by load increase while the lock-up clutch 70 is set to be in the engaged state. Further, degradation in durability of the drive train can be avoided. Yet further, the lock-up clutch 70 is herein kept to be in the engaged state under the engine stall avoiding control until the engine speed reaches the lock-up release engine speed even when the engine speed is reduced. Therefore, an operator is allowed to operate the motor grader 1 under the condition that the lock-up clutch 70 is kept to be in the engaged state even in low speed travelling at an engine speed less than or equal to the low idle engine speed. For example, an exemplary case is herein assumed that the vehicle speed is 1.3 km/h where the engine speed corresponds to the low idle engine speed at the first speed stage for forward travelling. In this case, the lock-up clutch 70 is kept to be in the engaged state even when the vehicle speed is 1.0 km/h. Accordingly, deterioration of a control feeling of an operator can be prevented in low speed travelling.

Further, the upper limit engine speed is configured to be limited to the working-use upper limit engine speed at the low speed stages in the present exemplary embodiment. Therefore, a higher speed stage is configured to be selected compared to the well-known devices. In other words, the engine speed becomes lower than that of the well-known devices while a higher speed stage is selected. Chances of occurrence of an engine stall are thereby increased. However, occurrence of an engine stall can be reliably avoided by the engine stall avoiding control. In other words, the upper limit engine speed can be limited to a lower engine speed at the low speed stages, and the fuel consumption can be further improved.

Other Exemplary Embodiments

The present invention is not limited to the aforementioned exemplary embodiment. A variety of changes and modification can be herein made without departing from the scope of the present invention.

(a) Specific numeric values, set for the upper limit engine speed in the aforementioned exemplary embodiment, are exemplary only. Therefore, the upper limit engine speed of the present invention is not limited to the aforementioned numeric values.

(b) In the aforementioned exemplary embodiment, the upper limit engine speed control is configured to be executed when automatic speed-stage shifting is executed at the middle speed stages. However, the present invention can be similarly applied to a case that manual speed-stage shifting is executed at the middle speed stages.

(c) in the aforementioned exemplary embodiment, the upper limit engine speed control is configured to be executed in forward travelling. However, the present invention can be similarly applied to a case that the upper limit engine speed control is executed in rearward travelling.

Figure 12:
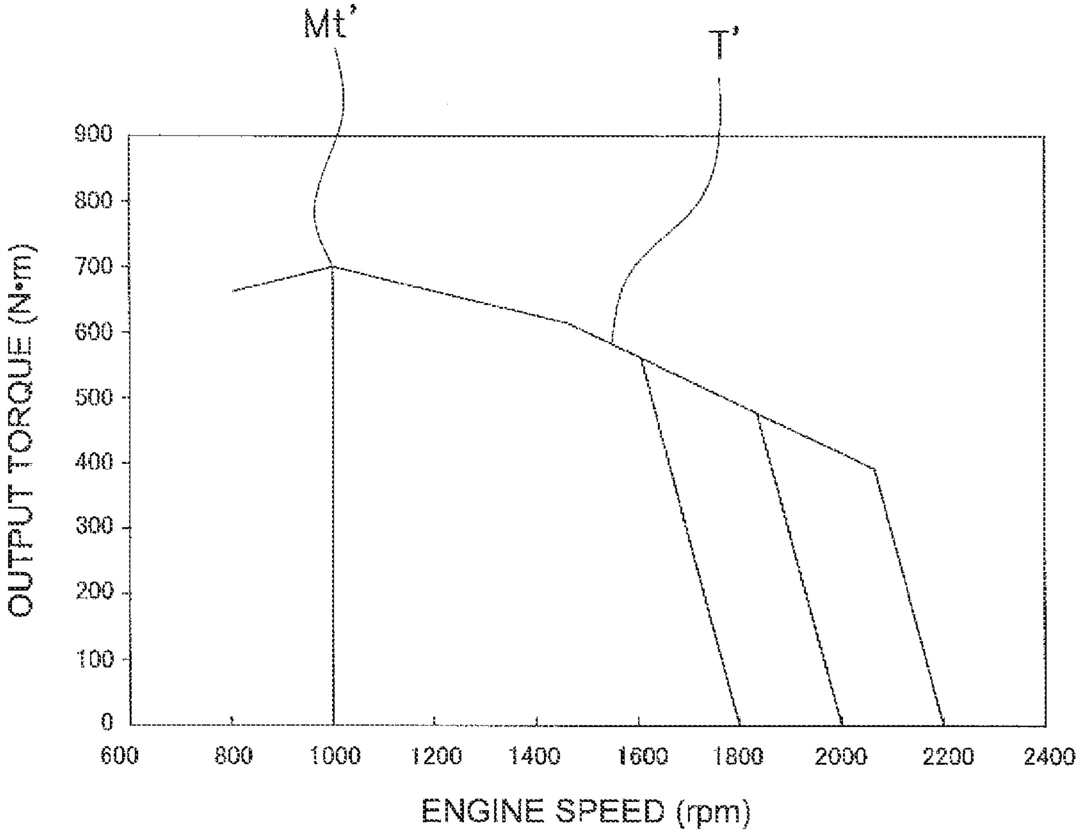
FIG. 12 is a chart representing an engine torque curve according to another exemplary embodiment.

(d) In the aforementioned exemplary embodiment, the maximum torque point (see Mt in FIG. 6) is set for the engine torque curve T where the engine speed is 1450 rpm. However, the maximum torque point (see Mt' in FIG. 12) may be set for an engine torque curve T' where the engine speed is roughly 800 rpm (1000 rpm in FIG. 12) corresponding to the low idle engine speed, and a torque value may be set to be reduced in proportion to increase in the engine speed. In this case, a tolerance range for engine speed reduction due to engine load is widened. Therefore, occurrence of an engine stall and a hunting phenomenon can be inhibited, and simultaneously, the regulation line at the working-use upper limit engine speed can be set on a lower engine speed side. The motor grader according to the illustrated embodiment can efficiently improve fuel consumption in working without reducing the maximum speed in out-of-service travelling.

The invention claimed is:

1. An engine speed control device for a motor grader, the motor grader including a transmission with a plurality of manually shiftable low speed stages and at least one high speed stage, the transmission being configured to switch between a manual mode for manually selecting one of all the speed stages and an automatic shifting mode for automatically shifting a predetermined speed stage and higher, the engine speed control device comprising:

an upper limit engine speed control unit configured to control an upper limit engine speed depending on the speed stage of the transmission such that:

the upper limit engine speed is set to an out-of-service travelling-use upper limit engine speed when the transmission is in the at least one high speed stage; and the upper limit engine speed is set to a working-use upper limit engine speed when the transmission is in any one of the low speed stages, the working-use upper limit engine speed being lower than the out-of-service travelling-use upper limit engine speed.

2. The engine speed control device for a motor grader recited in claim 1, wherein the upper limit engine speed control unit is configured to set the upper limit engine speed to be the working-use upper limit engine speed at any one of the low speed stages regardless of which of a working state and an out-of-service state is set for a working unit of the motor grader.

3. The engine speed control device for a motor grader recited in claim 1, wherein the working-use upper limit engine speed is greater than or equal to 70% and less than or equal to 90% of a high idle engine speed.

4. The engine speed control device for a motor grader recited in claim 1, wherein the transmission has a plurality of automatically shiftable middle speed stages between the plural low speed stages and the at least one high speed stage, the upper limit engine speed control unit is configured to set the upper limit engine speed to be an automatic-shifting-use upper limit engine speed at any one of the middle speed stages, the automatic-shifting-use upper limit engine speed being higher than the working-use upper limit engine speed and lower than the out-of-service travelling-use upper limit engine speed.

5. The engine speed control device for a motor grader recited in claim 4, wherein the automatic-shifting-use upper limit engine speed is higher than an engine speed at which automatic speed-stage shifting is executed.

6. The engine speed control device for a motor grader recited in claim 1, further comprising:

an accelerator pedal for allowing an operator to set an engine speed; and an accelerator opening degree detection unit configured to detect an accelerator opening degree set by the accelerator pedal, wherein the upper limit engine speed control unit is configured to set the upper limit engine speed to be the working-use upper limit engine speed at any one of the low speed stages by limiting an upper limit of an accelerator opening degree signal produced in accordance with the accelerator opening degree.

7. The engine speed control device for a motor grader recited in claim 1, wherein the motor grader is configured to change an operating mode of the engine between a power mode for using the engine at a high power and an economy mode for using the engine at a low power, the engine speed control device further includes engine mode determination unit configured to determine which of the power mode and the economy mode is set as the operating mode of the engine, and the upper limit engine speed control unit is configured to execute the control only when the economy mode is set as the operating mode of the engine.

8. A motor grader comprising:

an engine;

at least a pair of front and rear travelling wheels;

a transmission having a plurality of manually shiftable low speed stages and at least one high speed stage, the transmission being configured to switch between a manual mode for manually selecting one of all the speed stages and an automatic shifting mode for automatically shifting a predetermined speed stage and higher, and to change and transmit power from the engine to at least either of the at least a pair of front and rear travelling wheels;

a working unit; and an engine speed control device comprising an upper limit engine speed control unit configured to:

set an upper limit engine speed to be an out-of-service travelling-use upper limit engine speed at the at least one high speed stage; and set the upper limit engine speed to be a working-use upper limit engine speed at any one of the low speed stages, the working-use upper limit engine speed being lower than the out-of-service travelling-use upper limit engine speed, wherein a matching torque point is set on higher engine speed side than a maximum torque point of an engine torque curve for the engine, the matching torque point being an intersection between the engine torque curve and a regulation line where the upper limit engine speed is set to be the working-use upper limit engine speed.

9. The motor grader recited in claim 8, wherein the engine torque curve is set for setting the maximum torque point to be closer to a low idle engine speed and for reducing a torque value in proportion to engine speed increase.

10. A motor grader comprising:

an engine;

at least a pair of front and rear travelling wheels;

a transmission having a plurality of manually shiftable low speed stages and at least one high speed stage, the transmission being configured to switch between a manual mode for manually selecting one of all the speed stages and an automatic shifting mode for automatically shifting a predetermined speed stage and higher, and to change and transmit power from the engine to at least one of the front and rear travelling wheels;

a torque converter including a lock-up clutch, the torque converter configured to transmit driving force from the engine to the transmission;

a working unit;

an engine speed detection unit configured to detect an engine speed;

a lock-up clutch control unit configured to disengage the lock-up clutch when the engine speed becomes lower than or equal to a lock-up release engine speed set to be lower than the low idle engine speed while the lock-up clutch is engaged; and an engine speed control device comprising an upper limit engine speed control unit configured to:

set an upper limit engine speed to be an out-of-service travelling-use upper limit engine speed at the at least one high speed stage; and set the upper limit engine speed to be a working-use upper limit engine speed at any one of the low speed stages, the working-use upper limit engine speed being lower than the out-of-service travelling-use upper limit engine speed.

11. The motor grader recited in claim 10, wherein the torque converter further includes a damper configured to attenuate variation in torque from the engine, and the lock-up release engine speed is higher than a resonance rotation speed of the damper.

12. The motor grader recited in claim 8, further comprising a transmission control section configured to control shifting of the speed stages by the transmission in accordance with a signal from a shift lever, an operating signal from a transmission mode switch, a vehicle speed and the engine speed.

* * * * *